United States Patent Office 3,338,602
Patented Aug. 29, 1967

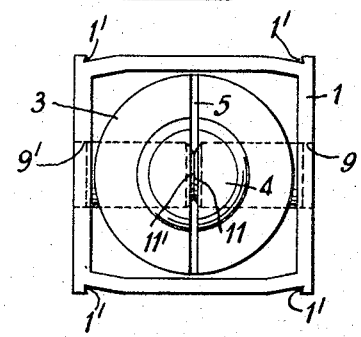
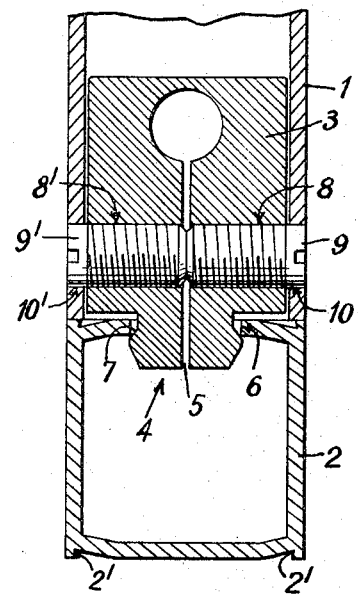

3,338,602
DEVICE FOR FIXING TWO PERPENDICULAR TUBULAR SHAPED PIECES
Maurice Arnd, Sablons 36, Neuchatel, Switzerland
Filed June 4, 1965, Ser. No. 461,442
Claims priority, application Switzerland, June 10, 1964, 7,591/64
4 Claims. (Cl. 287—2)

The present invention has for its object a device for fixing two perpendicular tubular shaped pieces.

This device is characterized in that it comprises a separate connecting member, having a flexible projection adapted to pass through an opening made in one of the said shaped pieces, and means for securing said connecting member inside the other shaped piece and simultaneously deforming the projection of said member so as to block the two shaped pieces one relative to the other.

The accompanying drawing shows, by way of example, one embodiment of the device which is the object of the present invention.

FIG. 1 is a sectional view of the device.

FIG. 2 is a view from under FIG. 1, in which the lower shaped piece has been omitted.

The device shown serves to fix together two tubular shaped pieces 1 and 2 perpendicular one to the other. Each shaped piece is of square cross section and is provided with hooking grooves 1' and 2' respectively along the edges or rims of two opposed faces in the case of the shaped piece 1 and of a single face in the case of the shaped piece 2. These grooves 1' and 2' are not part of the invention and serve for the hooking in particular of covering shaped pieces (not shown). A connecting member 3 of the shape of a cylindrical body provided with a projection 4 is mounted inside the shaped piece 1. This member 3 as well as the projection 4 are slit at 5 along an axial plane. The flexible projection 4 is adapted to pass through an opening 6 provided in the shaped piece 2 and comprises a conical enlargement 7.

The connecting member 3 has two tapped coaxial holes 8, 8' perpendicular to the plane of the slot 5, these holes receiving coaxial screws 9, 9' respectively passing through corresponding holes 10, 10' pierced in two opposed faces of the shaped piece 1, the inner ends 11, 11' respectively of these screws 9, 9' contacting one another.

The fixing of the two perpendicular shaped pieces 1 and 2 by means of the device described is effected in the following manner:

The projection 4 is inserted in the corresponding opening 6 of the shaped piece 2 and then the screws 9 and 9' are tightened until they separate the slot 5. The conical enlargement 7 then acts on the edge of the opening 6 so as to force the corresponding face of the shaped piece 2 against the end of the shaped piece 1. In FIG. 1 the screws 9, 9' enter into contact one with the other but have not yet brought about the spacing of the slot 5, and consequently the blocking of the shaped pieces one relative to the other.

According to a variant, one could make use of only one screw 9 bearing against the opposed face of the slot 5 to separate the same and block the two shaped pieces one against the other as described above. In such a case, a second screw would be provided to fix the connecting member in the shaped piece 1 in a position diametrically opposite to the first screw.

Instead of having a body of cylindrical shape, the connecting member could have any other cross section. Similiarly, the cross section of the shaped pieces could differ from the one shown.

What I claim is:

1. A device for connecting two members together, said device comprising a flexible connecting element, one of said members having an opening, said flexible element including a main portion accommodated in the other of said members and a projection portion inserted into said one member through said opening, said flexible element being provided with a slit extending from said projection portion to said main portion and defining divided sections, and a pair of diametrically opposed abutting members in the other of said members and each respectively threaded in separate divided sections for deforming the projection portion in correspondence with the degree of threaded engagement in said sections to thereby lock said projection portion in said one member at said opening.

2. A device as claimed in claim 1, wherein said projection portion is provided with a conical shoulder, said shoulder engaging said one member at said opening upon deformation of the projection portion.

3. A device as claimed in claim 2, wherein said opposed members are in abutment at said slit.

4. A device as claimed in claim 2, wherein said opposed members are screws including flat heads which are flush with said other member at the outer surface thereof.

References Cited

UNITED STATES PATENTS

| 1,891,048 | 12/1932 | Keefe | 287—124 |
|---|---|---|---|
| 2,282,641 | 5/1942 | Corey | 85—32 |
| 2,649,884 | 8/1953 | Westover | 85—80 |
| 2,657,944 | 11/1953 | Miller | 287—2 |
| 3,074,589 | 1/1963 | Chaney | 285—404 |
| 3,204,593 | 9/1965 | Steiner | 287—124 |

FOREIGN PATENTS 1,386,282  12/1964  France.

CARL W. TOMLIN, *Primary Examiner.*

R. S. BRITTS, *Assistant Examiner.*